Dec. 3, 1968   D. N. SCHWARDT   3,414,353
WEB DRIVING MECHANISM
Filed April 12, 1965

DAVID N. SCHWARDT
INVENTOR.

BY

ATTORNEYS

United States Patent Office 3,414,353
Patented Dec. 3, 1968

3,414,353
WEB DRIVING MECHANISM
David N, Schwardt, Rochester, N.Y., assignor to Eastman Kodak Company, Rochester, N.Y., a corporation of New Jersey
Filed Apr. 12, 1965, Ser. No. 447,384
5 Claims. (Cl. 355—71)

ABSTRACT OF THE DISCLOSURE

A projection printer receives a film strip containing a plurality of image frames and having a plurality of apertures. Each aperture is located at a specific position relative to each image frame. A reciprocating claw is engageable with the apertures in the film for sequentially advancing the image frames to a printing position for exposing a photosensitive paper. Substantially automatic operation is achieved by control means including timer means. The control means initiates and terminates the exposure cycle, advances an unexposed portion of the photosensitive paper into a printing position, and controls the claw driving mechanism for advancing the next film image into printing position following exposure of the paper.

---

The present invention relates to a web drive mechanism and more particularly to a web drive arrangement in a photographic projection printer wherein each increment of film movement requires accurate positioning.

Many automatic printers are known which project a plurality of images on a photosensitive printing paper web by means of sequentially passing light through images on a developed negative film strip. Since many prior art cameras tend to have a slightly different framing apertures and driving mechanisms, it often occurred that the leading and trailing edges of the negatives were not a predetermined distance apart. Thus, it has been the practice in projection printers to adjust the position of the negatives to match the masking frame within a printer directly prior to each printing operation. The means for accomplishing this delays printing as the film is positioned and classified while in the masking frame. However, with the advent of films having a single positioning aperture per negative frame, positioning techniques may be modified to substantially increase the speed of the printing cycle.

Therefore, an object of the present invention is to provide an improved arrangement for a photographic projection printer film web drive mechanism.

In an environment of my invetnion, the projection printer is provided with a negative framing mask in a specific location relative to a lens and printing paper web. According to my invention, the film web is advanced by a claw to have each frame properly positioned in the framing mask whereby complex film advance mechanisms and alignment problems are eliminated. Since no optical study of the film within the mask is required for positioning, classification prior to the image being placed therein becomes entirely feasible.

Figure 1:
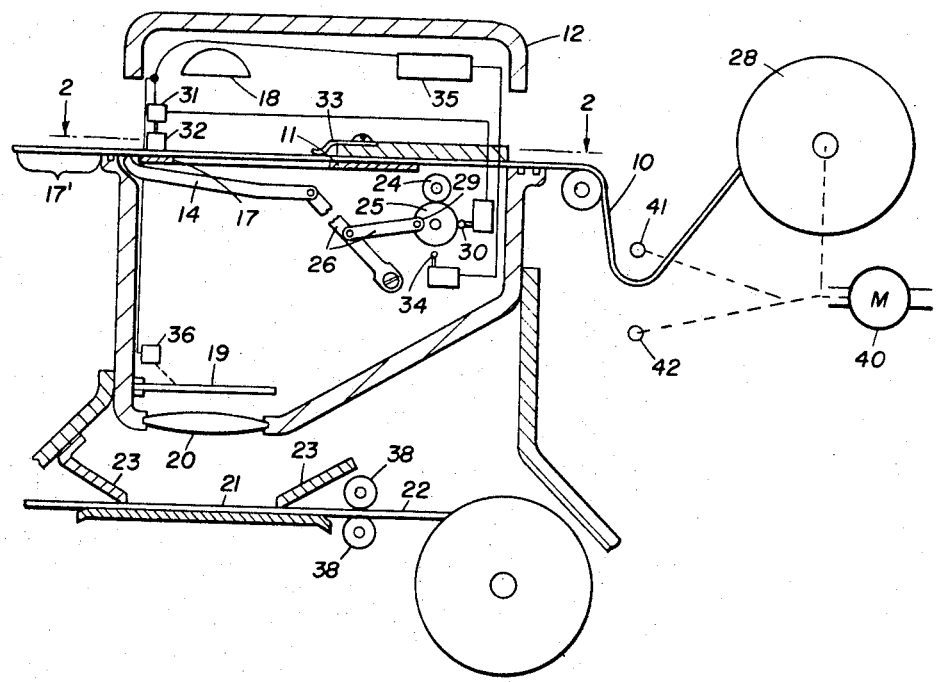
Figure 2:
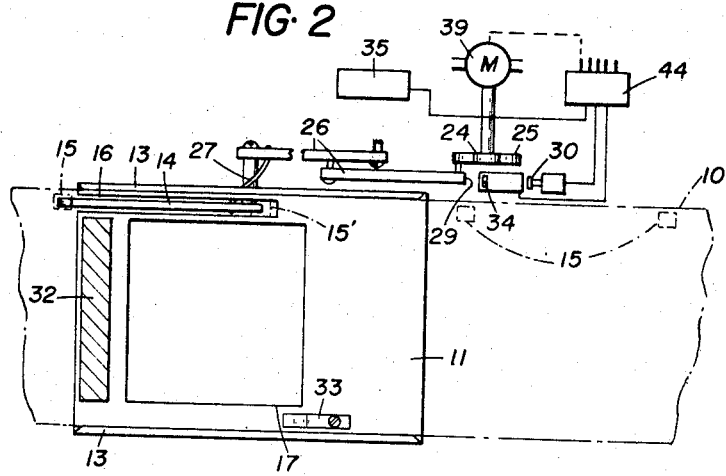

The subject matter which is regarded as my invention is particularly pointed out and distinctly claimed in a concluding portion of this specification. The invention, however, as to its organization and operation, together with further objects and advantages thereof, will best be understood by reference to the following description taken in connection with the accompanying drawing, in which:

FIG. 1 is a simplified elevation view partially in cross section of one embodiment of my invention; and FIG. 2 is a diagrammatic section view taken along the line 2—2 of FIG. 1.

Referring now to the drawing, wherein like numbers indicate similar parts, I have shown in FIG. 1 a film strip 10 arranged to be moved over a support platform 11, frame by frame through a projection printing station 12 by a claw 14. As shown more clearly in FIG. 2 the film strip 10 (in phantom lines) is laterally aligned by means such as guides 13 cooperating with the support platform 11. Also as shown in FIG. 2, the film strip is provided with one aperture 15 per frame thereof. It should be noted that the platform 11 is also provided with a guideway 16 allowing film driving movement of the claw 14.

In the film being processed by the present invention, the aperture 15 is located in a predetermined specific position relative to the image developed on each portion of the film strip. Therefore, sequentially placing of this aperture 15 in a specific location, (indicated at 15') compared to a framing aperture 17 defined by the platform 11, results in the framing aperture 17 sequentially defining the useful negative image area of each frame of the film strip 10.

During printing a lamp 18 illuminates the film strip in the region of the aperture 17, and during a print exposure light thereof is projected through a shutter 19 and a lens 20 to a region 21 of a photosensitive paper web 22 with the portion 21 being defined by masking means 23. Thus each time one of the apertures 15 is moved to the position indicaed in FIG. 2 at 15', the shutter 19 may be opened to print an image in the region 21 with assurance that the film strip is properly positioned and the image is properly masked.

Such a system is a substantial improvement over prior art wherein it was necessary to visually align each frame of the negative film strip prior to closing the printing station 12 and making a print. Not only is no adjustment required, but the entire classification of each image may be accomplished in a region 17' external to the printing station 12. Such an area as 17' may be continuously illuminated without damage to the paper 22 within the printing station.

In accordance with my invention an automatic series of operations create each print exposure on the paper web 22. Once the film strip 10 has been inserted sufficiently to be within the operating region of the claw 14, the system is started whereupon a drive shaft rotates a gear 24 counterclockwise to drive an eccentric drive member 25 to cause a linkage 26 to reciprocate. During each complete revolution of gear 24, the claw 14 is reciprocated through a cycle of operation including an advance stroke wherein the claw moves from the position shown in the drawings toward the right to the position where the end of the claw is at the aperture position designated 15' and then, during a return stroke, the claw moves back to the left to the illustrated position. Each advance stroke of the claw moves the film strip one complete frame length toward a take-up reel 28 and brings a new image frame to framing aperture 17. During the first stroke of this cycle, the claw 14 is biased into the aperture 15 by a spring 27 (FIG. 2) and during the second stroke of the cycle of operation the claw moves downwardly against the biasing force of spring 27 and slides along bottom of film strip 10. The film strip is held against movement to the left with the claw by suitable clamp structure, such as those shown at 32 and 33 in the drawings and described later. From the foregoing description, it will be apparent that during each complete rotation of gear 24 and drive member 25, one film aperture 15 (i.e., the aperture to the left of aperture 15') and the corresponding image frame are advanced to move the image frame into the printing position where it is properly masked by the framing aperature 17.

As indicated in the drawing, when the claw 14 is in its most projected position (the illustrated position) it engages an aperture 15 corresponding to the next film image to be printed. In the most retracted position (15') of the claw 14 the eccentric drive 25 or a projection or extension 29 thereof or a surface of the linkage 26 driven thereby engages a switch operator 30 to provide a signal which energizes a clamping solenoid 31 which distends a clamp 32. In another embodiment, a spring 33 engages the film strip 10 to form the claming means. These clamp means prevent film movement during return movement of the claw 14 to the position shown in the drawings. With the film strip 10 clamped in position, the eccentric drive 25 continues in its rotation until the extension 29 thereof contacts a second switch operator 34 and provides a signal to energize a timer device 35 and de-energize the drive for gear 24. As mentioned above, the complete stroke of the drive 25 is selected to move the claw 14 sufficiently forward to pick up a next aperture 15 of the film strip 10.

The timer device 35 energizes a solenoid 36 to open the shutter 19 for a sufficient period to attain a desirable exposure and then de-energizes the solenoid 36. At the same time, the drive for gear 24 is again energized by timer device 35 and the cycle is repeated. During the printing cycle, the operator is provided with an opportunity to view the image in the region 17' (the next image to be printed) and make color or intensity corrections as required therefor. Such corrections are accomplished in a relatively conventional manner and need not be set fourth in detail herein.

As will become apparent to those skilled in this art, the timer device 35 will also provide sufficient signal information to a drive system including rollers 38 to advance the paper web 22 one print distance during the period that the film 10 is being advanced. Usually the film advance device, illustrated as a motor 39 (FIG. 2) forms a part of a print mechanism operable to make prints from several sizes of film such as 620, 120, and the like, as well as film strips which are provided with one aperture per frame.

The total drive system of the film is designed so that the claw 14 will not damage the film strip 10. Thus, I prefer that the take-up reel 28 be provided with a separate drive motor 40 operable in accordance with the signal information provided thereto by a pair of dancer loop sensing devices 41 and 42. This independent drive maintains the inertia of the take-up reel and its drive forces separate from the force which must be developed by the claw 14. A substantially similar configuration is provided to isolate the inertia of the supply reel (not shown) from the claw 14.

As shown more clearly in FIG. 2, the various switching elements of my invention receive energy and transmit signals, as by way of example, to the motor 39 through a multiple contact plug arrangement indicated at 44. When the present invention is not in use, several other more complex film strip advancing mechanisms may be used to attain proper framing of each negative of films not having the apertures 15. Two such more complex film strip advancing mechanisms are illustrated in copending patent applications Ser. No. 447,387, now U.S. Patent 3,315,862, and Ser. No. 447,386, now U.S. Patent 3,369,449, filed concurrently herewith in my name as sole inventor and in the names of Ralph E. Klauss and Michael A. Petranto as joint inventors respectively and each assigned to the assignee of the present invention. Each of these copending applications also discloses in greater detail more complex means for powering the drive gear 24. However, as will be apparent to those skilled in this art, other conventional drive systems may be used for this purpose and the present invention is useable with such other projection printers.

While I have shown a particular embodiment of this invention, modifications thereof will occur to those skilled in this art. I intend, therefore, to have the appended claims cover such embodiments as properly fall within the scope of the present invention.

I claim:
1. A projection printer for a film having a plurality of image frames and having an aperture for each frame located in a specific position relative to each image frame, the printer comprising:
   means for framing a film image;
   a claw adapted to engage the apertures in the film for advancing the image frames to said framing means;
   means for reciprocating said claw through a cycle of operation including an advance stroke and a return stroke;
   means for engaging the claw in an aperture of the film during the advance stroke of said claw, the claw being movable out of engagement with the aperture during the return stroke of the claw;
   means for preventing movement of the film away from the framing means during the return stroke of the claw;
   means for advancing an unexposed portion of a photosensitive paper to a printing position;
   means for projecting the film image in the framing means onto said portion of the photosensitive paper in the printing position thereby effecting exposure of said portion of the paper; and
   control means for operating the projecting means for initiating and terminating exposure of said portions of said paper in said printing position and then advancing the next image frame to the framing means and advancing another unexposed portion of the paper to the printing position.

2. A printer as set forth in claim 1 wherein said means for preventing movement of the film away from the framing means comprises a clamp member engageable with the film during the return stroke of the claw, and means operable by the control means for disengaging the clamp member from the film during the advance stroke of the claw.

3. A printer, as set forth in claim 1, wherein said projecting means comprises a shutter movable between a first position wherein the shutter blocks exposure of the paper in the printing position and a second position wherein the shutter permits exposure of the paper in the printing position, means for moving the shutter between its two positions; and
   said control means further comprising timer means operatively connected to the shutter moving means for effecting exposure of the paper in said printing position for a predetermined time interval.

4. A projection printer for a film having a plurality of image frames and having an aperture for each frame located in a specific position relative to each image frame, the printer comprising:
   means for framing a film image;
   a claw adapted to engage the apertures in the film for advancing the image frames to said framing means;
   means for reciprocating said claw through a cycle of operation including an advance stroke and a return stroke;
   means biasing said claw in a direction to effect engagement between said claw and one of said apertures in the film during the advance stroke of said cycle of operation and thereby affect advancement of the image frames toward said framing means, said claw being movable out of said aperture against the force of said biasing means to permit movement of said claw with respect to the film from one aperture to a trailing aperture in the film during the return stroke of said cycle of operation;
   means for holding the film against movement away from said framing means during the return stroke of said claw;
   means for advancing an unexposed portion of a photosensitive paper to a printing position;

means for projecting the film image in the framing means onto said portion of the photosensitive paper in the printing position thereby effecting exposure of said portion of the paper; and control means including timer means operable in timed relation with said claw reciprocating means for operating the projecting means for initiating and terminating the exposure of said portion of the paper in the printing position and for initiating and terminating operation of said paper advancing means after each exposure of said paper in the printing position, the control means initiating operation of said claw reciprocating means to advance the next image frame to the framing means after exposure of said photosensitive paper in the printing position.

5. A printer as set forth in claim 4 wherein the projection means comprises a shutter movable between an open position wherein paper in the printing position can be exposed and a closed position wherein the shutter blocks exposure of paper in the printing position, the shutter being coupled to said timer means of said control means so that the timer means controls movement of the shutter between its positions, thereby controlling the exposure of the paper in the printing position.

References Cited
UNITED STATES PATENTS 3,078,775   2/1963   Lee et al. _____ 88—24 X
3,152,741   10/1964   Jorgensen _____ 352—194 X NORTON ANSHER, *Primary Examiner.*

RICHARD A. WINTERCORN, *Assistant Examiner.*